(12) United States Patent
Pan et al.

(10) Patent No.: US 8,124,282 B2
(45) Date of Patent: *Feb. 28, 2012

(54) NONAQUEOUS ELECTROLYTE HAVING MALEIMIDE ADDITIVES AND SECONDARY CELLS EMPLOYING THE SAME

(75) Inventors: Jing-Pin Pan, Hsinchu Hsien (TW); Chang-Rung Yang, Taichung (TW); Tsung-Hsiung Wang, Taichung County (TW); Yueh-Wei Lin, Hsinchu (TW); Pin-Chi Chiang, Changhua County (TW); Jung-Mu Hsu, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1065 days.

This patent is subject to a terminal disclaimer.

(21) Appl. No.: 11/964,772

(22) Filed: Dec. 27, 2007

(65) Prior Publication Data

US 2008/0160418 A1 Jul. 3, 2008

(30) Foreign Application Priority Data

Dec. 29, 2006 (TW) ................................ 95149877 A

(51) Int. Cl.
*H01M 6/18* (2006.01)
(52) U.S. Cl. ........ 429/307; 429/328; 429/330; 429/332; 429/334; 429/335; 429/336; 429/200; 252/62.2
(58) Field of Classification Search .................. 429/328, 429/330, 332, 334, 335, 336, 200, 307; 252/62.2
See application file for complete search history.

(56) References Cited

U.S. PATENT DOCUMENTS 7,875,204 B2 * 1/2011 Pan et al. ...................... 429/188

FOREIGN PATENT DOCUMENTS

| CN | 1577945 | | 2/2005 |
| JP | 11-219723 | | 8/1999 |
| JP | 2000-306605 | | 11/2000 |
| TW | 561640 | | 11/2003 |
| TW | 200607132 | | 2/2006 |
| TW | 251361 | * | 3/2006 |

OTHER PUBLICATIONS

English language translation of abstract of JP 11-219723 (published Aug. 10, 1999).
English language translation of abstract of CN 1577945 (published Feb. 9, 2005).
English language translation of abstract of JP 2000-306605 (published Nov. 2, 2000).
English language translation of abstract of T W251361 (published Mar. 11, 2006).
Taiwanese language office action dated Mar. 29, 2011.
English language translation of abstract of TW 561640 (published Nov. 11, 2003).
English language translation of abstract of TW 200607132 (published Feb. 16, 2006).

* cited by examiner

*Primary Examiner* — Laura Weiner
(74) *Attorney, Agent, or Firm* — Thomas|Kayden

(57) ABSTRACT

A nonaqueous electrolyte having maleimide additives and rechargeable cells employing the same are provided. The nonaqueous electrolyte having maleimide additives comprises an alkali metal electrolyte, a nonaqueous solvent, and maleimide additives. Specifically, the maleimide additives comprise maleimide monomer, bismaleimide monomer, bismaleimide oligomer, or mixtures thereof. The maleimide additives comprise functional groups, such as a maleimide double bond, phenyl group carboxyl, or imide, enhancing the charge-discharge efficiency, safety, thermal stability, chemical stability, flame-resistance, and lifespan of the secondary cells of the invention.

15 Claims, 2 Drawing Sheets

NONAQUEOUS ELECTROLYTE HAVING MALEIMIDE ADDITIVES AND SECONDARY CELLS EMPLOYING THE SAME

BACKGROUND OF THE INVENTION

1. Field of the Invention

The invention relates to a nonaqueous electrolyte and secondary cells employing the same, and more particularly to a nonaqueous electrolyte having maleimide additives and secondary cells employing the same.

2. Description of the Related Art

Along with the rapid development and availability of portable electronic products, demand for lithium ion secondary batteries, due to their properties, including having a light weight, high voltage, and high energy density, etc., have increased. Furthermore, the use of polymer electrolytes in lithium ion secondary batteries has become more and more important and is attracting wide attention in research for size reduction and increasing design flexibility for electronic products.

In addition, from the viewpoint of environmental protection and energy conservation, products are apt to be made by green materials (lead/halogen/phosphorus-free), in order to avoid causing environmental pollution and runaway greenhouse effect. Therefore, a battery, having high performance, high energy density, and environmental protection properties, is desired.

Chargeable secondary batteries have high electromotive force and high energy density. Lithium ion secondary batteries, commercialized by Sony Energy Tec., are in heavy demand for use as the main power supply for mobile communication devices and portable electronic devices. Lithium ion secondary batteries provide a high level of battery voltage, and have exceptional electrode characteristics, even though it is unsafe when charging or discharging at high rates, and is more costly than the other materials.

For the development of lithium ion secondary batteries, it is an important technical issue to enhance the reliability, capacitance, charge-discharge efficiency, and lifespan of the battery. Besides efficient matching of the electrode material and the isolation membrane, the most effective way to enhance lithium ion secondary batteries is to improve its electrolyte properties. In general, the electrolyte comprises lithium salt and a nonaqueous solvent. Since an ideal electrolyte should have the characteristics of high dielectric constant and low viscosity, cyclic carbonates (high dielectric constant) and linear carbonates (low viscosity) are thereby employed.

At present, an electrolyte simultaneously comprising thylene Carbonate propylene carbonate is commonly used in the industry and has a working voltage of 3.6V and an energy density of 250~300 Wh/L (or 90~110 Wh/kg). It has been discovered that by adding ethylene Carbonate in a propylene carbonate electrolyte system, the co-intercalation phenomenon of propylene carbonate with lithium occurs. Further, in the ethylene carbonate and propylene carbonate electrolyte system, improvements are necessary for thermal stability, flame retardancy and safety.

In order to solve the aforementioned problems, diethyl carbonate (DEC), dimethyl carbonate (DMC), ethyl methyl carbonate (EMC), vinylene carbonate, sulfites, sulfates, or phosphate was added to the ethylene carbonate and propylene carbonate electrolyte system, thereby preventing the dissolution of electrolytes and improving performance.

Although by merely adding the previous mentioned additives, the properties of the batteries can be improved to a certain degree, the effect however, is not very distinctive. Often, a certain property is improved and others are not affected. Since the additives are often costly, and some of the additives require a large amount to be used when individually applied, costs are greatly increased.

As the market and customers increase their demand for high capacity and practical usage properties in different operating conditions, the industry is pushed to design better products. Therefore, it is distinctively important to find an additive with good overall properties, or a combination of additives which can improve various properties of batteries.

BRIEF SUMMARY OF THE INVENTION

A nonaqueous electrolyte having maleimide additives, employed in secondary cells, is provided. The nonaqueous electrolyte comprises an alkali metal compound, a nonaqueous solvent and a maleimide additive, wherein the maleimide additive comprises maleimide monomer, bismaleimide monomer, bismaleimide oligomer, or mixtures thereof.

According an embodiment of the invention, an alkali secondary cell is also provided. The alkali secondary cell comprises positive and negative electrode plates, an isolation membrane, located between the positive and negative electrode plates and the aforementioned nonaqueous electrolyte having maleimide additives.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
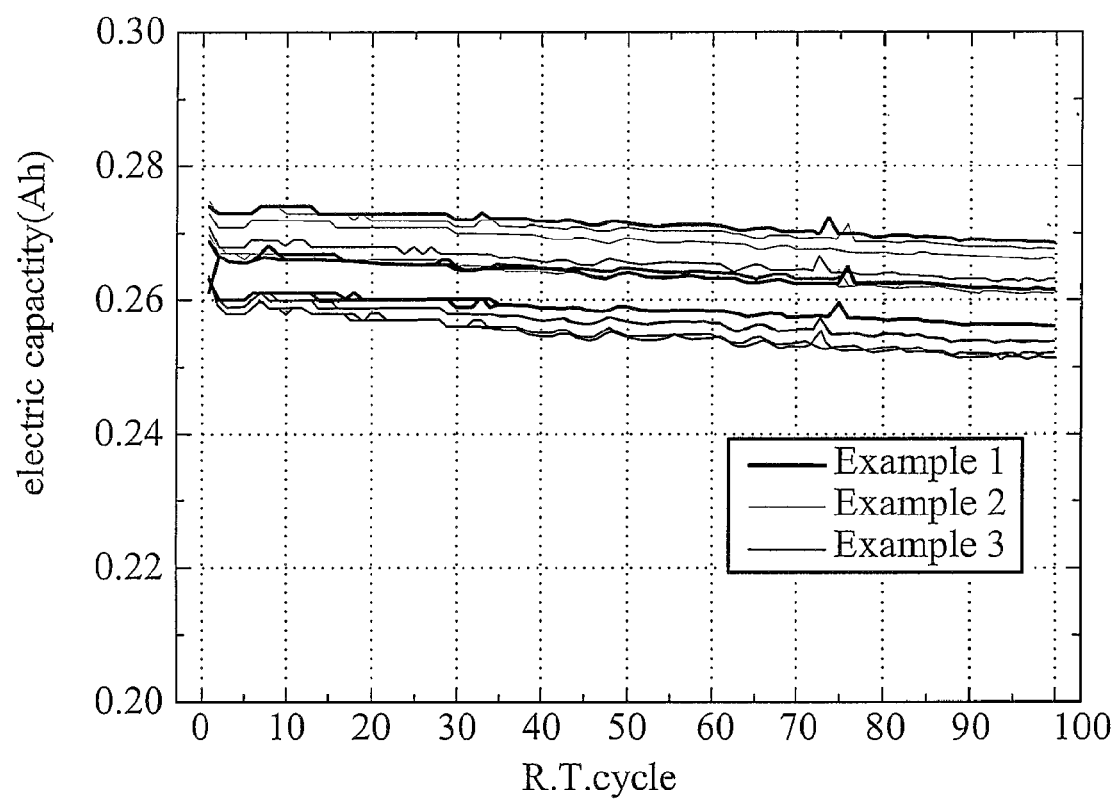
FIGS. 1 and 2 are graphs plotting electric capacity against R.T. cycle of nonaqueous electrolyte as disclosed in Comparative Example 1 and Examples 1-5.

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide a nonaqueous electrolyte having maleimide additives and secondary cells employing the same. The maleimide additives comprise functional groups, such as a maleimide double bond, phenyl group carboxyl, or imide, enhancing the charge-discharge efficiency, safety, thermal stability, chemical stability, flame-resistance, and lifespan of the secondary cells of the invention.

The secondary cell of the invention can comprise positive and negative electrode plates, an isolation membrane, located between the positive and negative electrode plates, and a nonaqueous electrolyte having maleimide additives.

Nonaqueous Electrolyte Having Maleimide Additives

The nonaqueous electrolyte of the invention can comprise an alkali metal compound, a nonaqueous solvent, and a maleimide additive.

The alkali metal compound, serving as an electrolyte, can comprise $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, or combinations thereof.

The nonaqueous solvent can be nonprotonic solvent, such as ethylene carbonate, propylene carbonate, butylene carbonate, dipropyl carbonate, acid anhydride, N-methyl pyrrolidone, N-methyl acetamide, N-methyl formamide, dimethyl formamide, diethoxyethane, γ-butyrolactone, acetonitrile, dimethyl sulfoxide, dimethyl sulfite, vinylene carbonate, propyl methyl carbonate, 13-dioxolane, 1,2-diethoxyethane, 1,2-dimethoxyethane, 1,2-dibutoxyethane, tetrahydrofuran, 2-methyl tetrahydrofuran, propylene oxide, methyl acetate, ethyl acetate, methyl butyrate, ethyl butyrate, methyl proionate, ethyl proionate, dimethyl carbonate, diethyl carbonate, ethyl methyl carbonate, propyl acetate, or combinations thereof.

The maleimide additive can be maleimide monomer, bis-maleimide monomer, bismaleimide oligomer, or mixture thereof. It should be noted that the maleimide additive has a weight ratio of 0.01~10 parts by weight, based on 100 parts by weight of the nonaqueous electrolyte.

The maleimide additive can have formula (I) and (II),

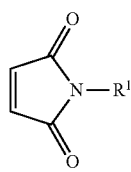

formula (I)

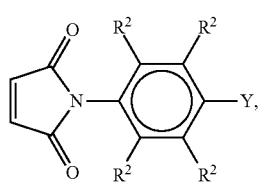

formula (II)

wherein $R^1$ comprises —$RCH_2$-(alkyl), —$RNH_2R$, —$C(O)CH_3$, —$CH_2OCH_3$, —$CH_2S(O)CH_3$, —$C_6H_5$, —$CH_2(C_6H_5)CH_3$, phenylene, diphenylene, cycloaliphatics, or silane-substituted aromatics, Y comprises —H, —R, —$RCH_3$, —$C(CH_3)_3$, —$S(O)$—R, —$CONH_2$, or —$C(CF_3)_3$, $R^2$ independently comprises H, F, Cl, Br, $HSO_3$, $SO_2$, or $C_{1~6}$ alkyl, and R independently comprises $C_{1~6}$ alkyl. For example, the maleimide additive can be maleimide-phenylmethane, phenyl-maleimide, methylphenyl maleimide, dimethylphenyl-maleimide, ethylenemaleimide, thio-maleimid, ketone-maleimid, methylene-maleinimid), maleinimidomethylether, maleimido-ethandiol, 4-phenylether-maleimid, 4,maleimido-phenylsulfone, or combinations thereof.

Further, the bismaleimide monomer can have formula (III) and (IV):

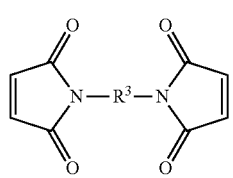

formula (III)

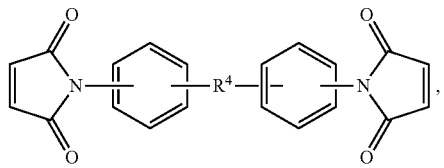

formula (IV)

wherein $R^3$ comprises —$RCH_2$-(alkyl), —$RNH_2R$—, —$C(O)CH_2$—, —$CH_2OCH_2$—, —$C(O)$—, —O—, —O—O—, —S—, —S—S—, —$S(O)$—, —$CH_2S(O)CH_2$—, —$(O)S(O)$—, —$C_6H_5$—, —$CH2(C_6H_5)CH2$-, —$CH_2(C_6H_5)(O)$—, phenylene, diphenylene, substituted phenylene or substituted diphenylene, $R^4$ comprises —$RCH_2$—, —$C(O)$—, —$C(CH_3)_2$—, —O—, —O—O—, —S—, —S—S—, —$(O)S(O)$— or —$S(O)$—, and R independently comprises hydrogen or $C_{1~4}$ alkyl. For example, the bismaleimide monomer can be N,N'-bismaleimide-4,4'-diphenylmethane, [1,1'-(methylenedi-4,1-phenylene)bismaleimide], [N,N'-(1,1'-biphenyl-4,4'-diyl)bismaleimide], [N,N'-(4-methyl-1,3-phenylene)bismaleimide], [1,1'-(3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene)dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid, [4,4'-bis(maleimido)-diphenylsulfone], or combinations thereof.

Moreover, the bismaleimide oligomer can be prepared by reaction of barbituric acid and a bismaleimide monomer, wherein the bismaleimide monomer is disclosed above and the barbituric acid has formula (V),

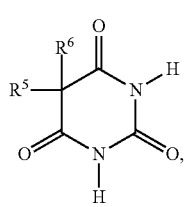

formula (V)

wherein $R^5$ and $R^6$ are the same or different and comprise H, $CH_3$, $C_2H_5$, $C_6H_5$, $CH(CH_3)_2$, $CH_2CH(CH_3)_2$, $CH_2CH_2CH(CH_3)_2$ or

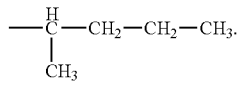

The bismaleimide oligomer is a multi-function bismaleimide oligomer with a hyper branch architecture or multi double-bond reactive functional groups. In the hyper branch architecture, the bismaleimide serves as an architecture matrix. The radical barbituric acid is grafted to the bismaleimide's double bond to begin branching and ordering to form the hyper branch architecture. The high-purity multi-function bismaleimide oligomer is prepared by adjustment of, for example, the concentration ratio, the chemical order addition procedure, the reaction temperature, the reaction time, the environmental condition, the branching degree, the polymerization degree, the structural configuration and the molecular weight. The branch architecture is [(bismaleimide monomer)-(barbituric acid)x]m, wherein x is 0~4 and m (repeating unit) is less than 20. In an embodiment, x may be 0.5~2.5 and m (repeating unit) may be 2~10. Additionally, each branch may further be branched. Thus, the total branch architecture is {[(bismaleimide monomer)-(barbituric acid)x]m}n, wherein x is 0~4 or 0.5~2.5, m (repeating unit) is less than 20 or 2~20, and n (repeating unit) is less than 50 or 5~20.

In some embodiment of the invention, the nonaqueous electrolyte can further comprise a surfactant, thinner, or carbonate, such as lithium carbonate, calcium carbonate, or magnesium carbonate.

Fabrication of Positive and Negative Electrode Plates

The alkali metal rechargeable cell comprises positive and a negative electrode plates. The preparation of the positive electrode plate is shown as follows. A positive electrode raw material comprising 80~95% positive electrode active substance, 3~15% conductive additive and 3~10% fluorine-containing resin adhesive is dissolved in n-methyl pyrrolidone (NMP) and uniformly coated on an aluminum foil roll (300 m×35 cm×20 μm). After drying, the positive electrode roll is pressed, stripped and vacuum-dried at 110° C. for 4 hrs. The positive electrode active substance may be lithium oxide, lithium sulfide, lithium selenide, or lithium telluride of vanadium, titanium, chromium, copper, molybdenum, niobium, iron, nickel, cobalt and manganese. The fluorine-containing resin adhesive may comprise polyvinylidene difluoride (PVDF). The conductive additive may comprise carbon black, graphite, acetylene black, nickel powder, aluminum powder, titanium powder or stainless steel powder.

The preparation of the negative electrode plate is shown as follows. A negative electrode raw material comprising 90% negative electrode active substance and 3~10% fluorine-containing resin adhesive dissolved in n-methyl pyrrolidone (NMP) is uniformly coated on an aluminum foil roll (300 m×35 cm×10 μm). After drying, the negative electrode roll is pressed, stripped and vacuum-dried at 110° C. for 4 hrs. The negative electrode active substance may be mesocarbon microbeads (MCMB), vapor grown carbon fiber (VGCF), carbon nano tube (CNT), coke, carbon black, graphite, acetylene black, carbon fiber, glassy carbon or fluorine-containing resin adhesive such as polyvinylidene difluoride (PVDF).

Isolation Membrane

This invention uses nonaqueous electrolyte having maleimide additives for the secondary cells and the maleimide additives can speedily perform polymerization to increase inner resistance and reduce conductivity of alkali ions, during temperature rise resulting from abnormal operations. Therefore, the choices for the isolation membrane are unlimited, and can be conventional PP isolation membrane, PE isolation membrane, or three (PP/PE/PP) isolation membranes.

The following description is of the best-contemplated mode of carrying out the invention. This description is made for the purpose of illustrating the general principles of the invention and should not be taken in a limiting sense. The scope of the invention is best determined by reference to the appended claims.

Preparation of Electrolyte

COMPARATIVE EXAMPLE 1

A 1.1M $LiPF_6$ solution containing an electrolyte solvent having a composition of ethylene carbonate, propylene carbonate, and diethyl carbonate (volume ratio EC/PC/DEC=3: 2:5) was provided. It should be noted that there was no maleimide additives disclosed in the invention added thereinto.

EXAMPLE 1

A maleimide monomer serving as a maleimide additive was dissolved in a 1.1M $LiPF_6$ electrolyte solution containing EC/PC/DEC=3:2:5 and sufficiently mixed. The weight ratio between the maleimide monomer and the electrolyte solution was 1:1000.

EXAMPLE 2

A bismaleimide monomer serving as a maleimide additive was dissolved in a 1.1M $LiPF_6$ electrolyte solution containing EC/PC/DEC=3:2:5 and sufficiently mixed. The weight ratio between the bismaleimide monomer and the electrolyte solution was 1:200.

EXAMPLE 3

A bismaleimide monomer serving as a maleimide additive was dissolved in a 1.1M $LiPF_6$ electrolyte solution containing EC/PC/DEC=3:2:5 and sufficiently mixed. The weight ratio between the bismaleimide monomer and the electrolyte solution was 1:100.

EXAMPLE 4

A bismaleimide monomer serving as a maleimide additive was dissolved in a 1.1M $LiPF_6$ electrolyte solution containing EC/PC/DEC=3:2:5 and sufficiently mixed. The weight ratio between the bismaleimide monomer and the electrolyte solution was 1:20.

EXAMPLE 5

A bismaleimide oligomer (reaction products of N,N'-bismaleimide-4,4'-diphenylmethane and pyrimidine-2,4,6(1H, 3H,5H)-trione, with a molar ratio of 10:1(N,N'-bismaleimide-4,4'-diphenylmethane:pyrimidine-2,4,6(1H,3H,5H)-trione) was dissolved in a 1.1M LiPF6 electrolyte solution containing EC/PC/DEC=3:2:5 and sufficiently mixed. The weight ratio between the bismaleimide monomer and the electrolyte solution was 1:40.

EXAMPLE 6

A bismaleimide oligomer (reaction products of N,N'-bismaleimide-4,4'-diphenylmethane and pyrimidine-2,4,6(1H, 3H,5H)-trione, with a molar ratio of 10:1(N,N'-bismaleimide-4,4'-diphenylmethane:pyrimidine-2,4,6(1H,3H,5H)-trione) was dissolved in a 1.1M $LiPF_6$ electrolyte solution containing EC/PC/DEC=3:2:5 and sufficiently mixed. The weight ratio between the bismaleimide monomer and the electrolyte solution was 5.1:100.

Measurement of Electric Conductivity

The electric conductivity of nonaqueous electrolyte as disclosed in Comparative Example 1 and Example 6 were respectively measured by the following method.

The ionic conductivity of the soft-gel polymer electrolyte was measured by the following method. The ionic conductivity (σ) was obtained by analysis of alternating current (AC)

impedance. With an alternating current application, the electrolyte was scanned from high frequency of 50,000 Hz to low frequency of 100 Hz to acquire a relationship between impedances and phase angles and converted into a Nyquist figure presented by real impedance (Z') and source impedance (-Z"). When the source impedance (-Z") of the ion diffusion curve was zero, the intercept of the real impedance (Z') was used for the calculation. The formula is shown as follows.

σ=L/A×R wherein σ=conductivity, L=a distance between two electrodes (cm), R=impedance of electrolyte (Ω), A=electrode area (cm²), and design of measuring tank L=0.5 cm and A=0.257π cm2.

The results were shown as in Table 1.

TABLE 1

|  | impedance of electrolyte (Ω) | | | conductivity (×10⁻³ S/cm) | | |
|---|---|---|---|---|---|---|
|  | R.T | -10□ | -20□ | R.T | -10□ | -20□ |
| Comparative Example 1 | 58.4 | 161.06 | 315.74 | 7.57 | 2.74 | 1.40 |
| Example 6 | 51.8 | 110.22 | 237.5 | 8.53 | 4.01 | 1.86 |

Accordingly, the results indicated that the nonaqueous electrolyte having maleimide additives of the invention had lower impedance of electrolyte and higher conductivity than the nonaqueous electrolyte without maleimide additives.

In the invention, since the maleimide additives comprise unpaired electrons and polar functional groups (such as —NH—, —CN, or —C=O) which are apt to form complex formation with lithium salts, the conductivity of ions is substantially improved. The chemical-mechanical relationship between the bismaleimide oligomer and the lithium ions was shown as in formula (VI).

wherein A was

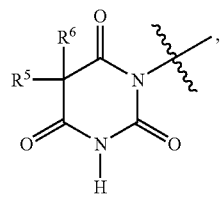

$R_1$ comprised —RCH₂-(alkyl), —RNH₂R—, —C(O)CH₂—, —CH₂OCH₂—, —C(O)—, —O—, —O—O—, —S—, —S—S—, —S(O)—, —CH₂S(O)CH₂—, —(O)S(O)—, —C₆H₅—, —CH₂(C₆H₅)CH₂—, —CH₂(C₆H₅)(O)—, phenylene, diphenylene, substituted phenylene or substituted diphenylene, $R^4$ comprised —RCH₂—, —C(O)—, —C(CH₃)₂—, —O—, —O—O—, —S—, —S—S—, —(O)S(O)— or —S(O)—, and R independently comprised hydrogen or $C_{1-4}$ alkyl, and $R^5$ and $R^6$ were the same or different and comprised H, CH₃, C₂H₅, C₆H₅, CH(CH₃)₂, CH₂CH(CH₃)₂, CH₂CH₂CH(CH₃)₂ or

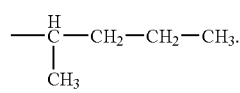

Reliability Test

The nonaqueous electrolytes obtained by Comparative Example 1 and Examples 1-5 were respectively poured into a jelly roll (No. 502030, 5 mm×20 mm×300 mm), and enveloped after vacuum.

Each of the cells was connected to the positive and negative electrode and a charging-discharging cycle test was con-

Figure 2:
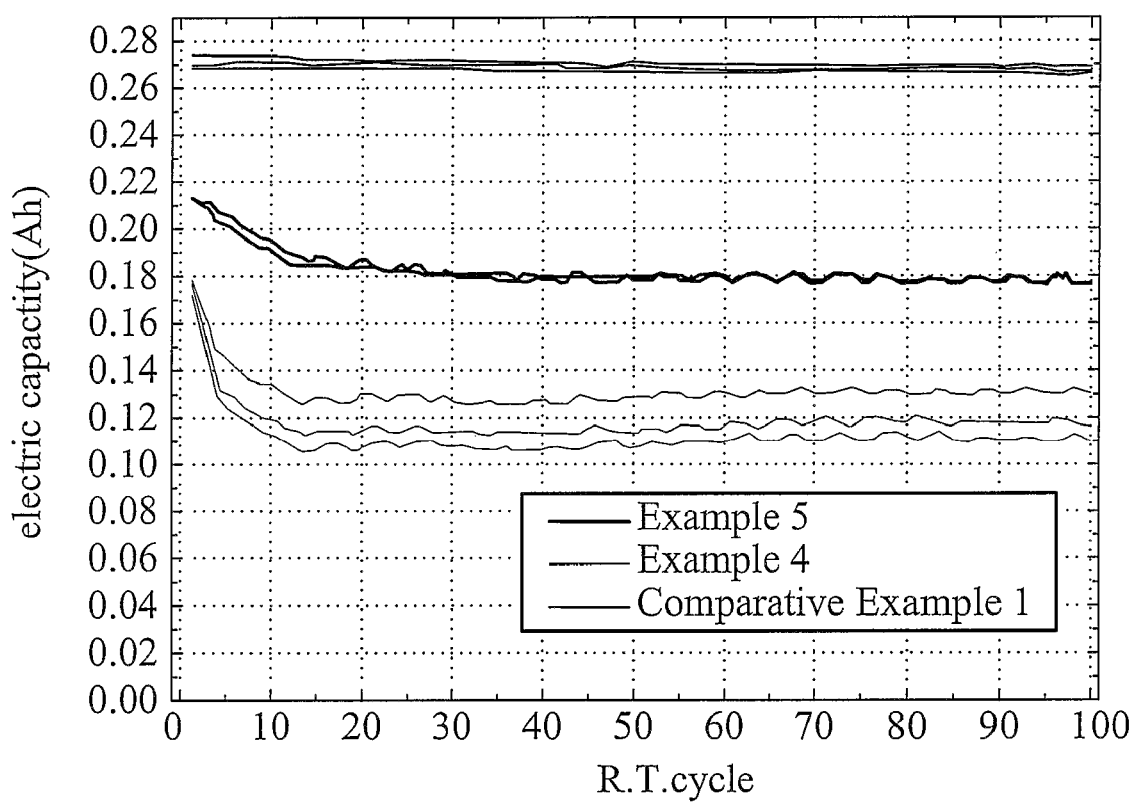

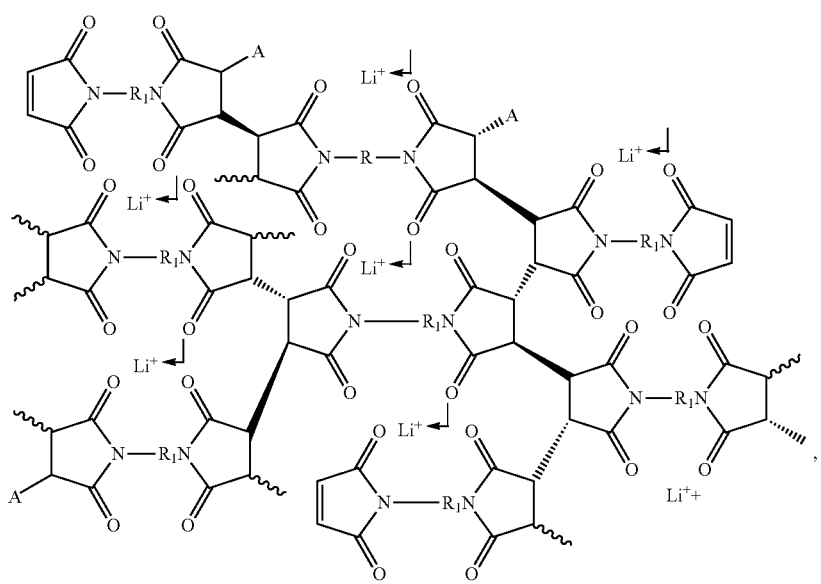

formula (VI)

ducted with an Arbin Model BT2042 as the battery/capacitor tester. During the charging-discharging test, the discharging capacity cycle characteristic was measured with charging finish voltage of 4.2V, discharging finish voltage of 2.75V and charging-discharging current of 150 mA. FIGS. 1 and 2 show the R.T. cycles of the cells of Comparative Example 1 and Examples 1-5. Accordingly, the capacitance variation of cells having maleimide additives was more reliable than that of cells without maleimide additives.

Flame Retardancy Test

The nonaqueous electrolytes of Comparative Example 1 and Examples 1-5 were burned for 10 sec to observe flame retardancy, as shown in Table 2. The results show that the nonaqueous electrolytes having 1 wt % maleimide additives exhibited superior flame retardancy.

TABLE 2

| | Comparative Example 1 | Example 4 | Example 5 | Example 6 |
|---|---|---|---|---|
| Flame retardancy test | Inflammation was stopped. Flame was stopped until carbonization is completed | Inflammation was stopped. Flame was immediately stopped. | Inflammation was stopped. Flame was immediately stopped. | Inflammation was stopped. Flame was immediately stopped. |

Since the maleimide additives are apt to be completely dissolved in a nonaqueous electrolyte and comprise functional groups, such as a maleimide double bond, phenyl group carboxyl, or imide. Note that the maleimide additives are polymerized via thermal catalysis to catch lithium ion and allow thermal run-away, should a battery reach a high working temperature. Therefore, the safety of the secondary cells of the invention is improved. The maleimide additives can further enhance the charge-discharge efficiency, thermal stability, chemical stability, flame-resistance, and lifespan of the secondary cells of the invention and are suitable for being added to any kind of electrolyte (aqueous electrolyte/nonaqueous electrolyte/glue electrolyte/semisolid electrolyte/solid electrolyte).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A nonaqueous electrolyte having maleimide additives, employed in rechargeable cells, comprising:
    an alkali metal compound;
    a nonaqueous solvent; and
    a maleimide additive, wherein the maleimide additive comprises bismaleimide oligomer, mixture of maleimide monomer and bismaleimide oligomer, mixture of bismaleimide monomer and bismaleimide oligomer, or mixture of maleimide monomer, bismaleimide monomer, and bismaleimide oligomer, wherein the bismaleimide oligomer is prepared by reaction of barbituric acid and a bismaleimide monomer, wherein the bismaleimide oligomer has a hyper branched architecture, wherein the branch architecture is [(bismaleimide monomer)-(barbituric acid)x]m, and x is between 0.5-2.5 and m (repeating unit) is between 2-10.

2. The nonaqueous electrolyte as claimed in claim 1, wherein the alkali metal compound comprises $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$ or combinations thereof.

3. The nonaqueous electrolyte as claimed in claim 1, wherein the nonaqueous solvent comprises ethylene carbonate, propylene carbonate, vinylene carbonate, butylene carbonate, dipropyl carbonate, acid anhydride, N-methyl pyrrolidone, N-methyl acetamide, N-methyl formamide, dimethyl formamide, diethoxyethane, y-butyrolactone, acetonitrile, dimethyl sulfoxide, dimethyl sulfite, propyl methyl carbonate, 1,3-dioxolane, 1,2-diethoxyethane, 1,2-dimethoxyethane, 1,2-dibutoxyethane, tetrahydrofuran, 2-methyl tetrahydrofuran, propylene oxide, methyl acetate, ethyl acetate, methyl butyrate, ethyl butyrate, methyl proionate, ethyl proionate, dimethyl carbonate, diethyl carbonate, ethyl methyl carbonate, propyl acetate, or combinations thereof.

4. The nonaqueous electrolyte as claimed in claim 1, wherein the maleimide additive has a weight ratio of 0.01-10 parts by weight, based on 100 parts by weight of the nonaqueous electrolyte.

5. The nonaqueous electrolyte as claimed in claim 1, wherein the maleimide additive has a weight ratio of 0.1-5 parts by weight, based on 100 parts by weight of the nonaqueous electrolyte.

6. The nonaqueous electrolyte as claimed in claim 1, wherein the maleimide additive has formulae (I) and (II):

formula (I)

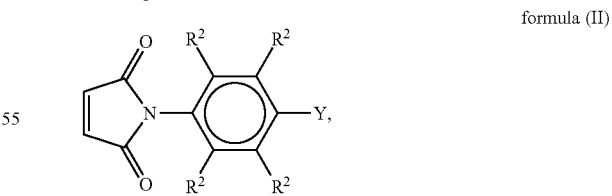

formula (II)

wherein R1 comprises —RCH2-(alkyl), —RNH2R, —C(O)CH3, —CH2OCH3, —CH2S(O)CH3, —C6H5, —CH2(C6H5)CH3, phenylene, diphenylene, cycloaliphatics, or silane-substituted aromatics, Y comprises —H, —R, —RCH3, —C(CH3)3, —S(O)—R, —CONH2, or —C(CF3)3, R2 independently comprises H, F, Cl, Br, HSO3, SO2, or C1~6 alkyl, and R independently comprises C1~6 alkyl.

7. The nonaqueous electrolyte as claimed in claim 1, wherein the maleimide additive comprises maleimide-phenylmethane, phenyl-maleimide, methylphenyl maleimide, dimethylphenyl-maleimide, ethylenemaleimide, thio-maleimid, ketone-maleimid, methylene-maleinimid), maleinimidomethylether, maleimido-ethandiol, 4-phenylether-maleimid, 4, maleimido-phenylsulfone, or combinations thereof.

8. The nonaqueous electrolyte as claimed in claim 1, wherein the bismaleimide monomer has formulae (III) and (IV):

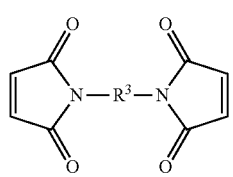

formula (III)

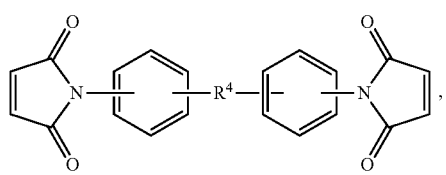

formula (IV)

wherein $R^3$ comprises —RCH2-(alkyl), —RNH2R—, —C(O)CH2—, —CH2OCH2—, —C(O)—, —O—, —O—)O—, —S—, —S—S—, —S(O)—, —CH2S(O) CH2—, —(O)S(O)—, —C6H5—, —CH2(C6H5) CH2—, —CH2(C6H5)(O)—, phenylene, diphenylene, substituted phenylene or substituted diphenylene, $R^4$ comprises —RCH2—, —C(O)—, —C(CH3)2—, —O—, —O—O—, —S—, —S—S—, —(O)S(O)— or —S(O)—, and R independently comprises hydrogen or C1~4 alkyl.

9. The nonaqueous electrolyte as claimed in claim 1, wherein the bismaleimide monomer comprises N,N'-bismaleimide-4,4'-diphenylmethane, [1,1'-(methylenedi-4,1-phenylene)bismaleimide], [N,N'-(1,1'-biphenyl-4,4'-diyl) bismaleimide], [N,N'-(4-methyl-1,3-phenylene)bismaleimide], [1,1 - (3,3'dimethyl-1,1'-biphenyl-4,4'-diyl)bismaleimide], N,N'-ethylenedimaleimide, [N,N'-(1,2-phenylene)dimaleimide], [N,N'-(1,3-phenylene)dimaleimide], N,N'-thiodimaleimide, N,N'-dithiodimaleimide, N,N'-ketonedimaleimide, N,N'-methylene-bis-maleinimide, bis-maleinimidomethylether, [1,2-bis-(maleimido)-1,2-ethandiol], N,N'-4,4'-diphenylether-bis-maleimid, [4,4'-bis(maleimido)-diphenylsulfone], or combinations thereof.

10. The nonaqueous electrolyte as claimed in claim 1, wherein the hyper branched architecture is further branched and represented by {[(bismaleimide monomer)-(barbituric acid)x]m}n, wherein x is between 0-4, m (repeating unit) is less than 20, and n is less than 50.

11. The nonaqueous electrolyte as claimed in claim 1, wherein the barbituric acid has formula (V):

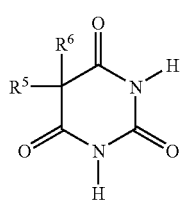

formula (V)

wherein $R^5$ and $R^6$ are the same or different and comprise H, $CH_3$, $C_2H_5$, $C_6H_5$, $CH(CH_3)_2$, $CH_2CH(CH_3)_2$, $CH_2CH_2CH(CH_3)_2$ or

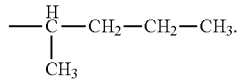

12. The nonaqueous electrolyte as claimed in claim 1, wherein the molar ratio of the barbituric acid and the bismaleimide monomer is 100:1-1:1.

13. The nonaqueous electrolyte as claimed in claim 1, wherein the molar ratio of the barbituric acid and the bismaleimide monomer is 20:1-1:1.

14. The nonaqueous electrolyte as claimed in claim 1, further comprising a surfactant, thinner, or carbonate.

15. An alkali secondary cell, comprising:
positive and negative electrode plates;
an isolation membrane, located between the positive and negative electrode plates; and
a nonaqueous electrolyte, having maleimide additives, as claimed in claim 1.

* * * * *